United States Patent
Burgmeier et al.

(10) Patent No.: US 10,241,988 B2
(45) Date of Patent: Mar. 26, 2019

(54) PRIORITIZING SMART TAG CREATION

(71) Applicant: Lenovo (Singapore) Pte. Ltd., Singapore (SG)

(72) Inventors: Hermann Franz Burgmeier, Chapel Hill, NC (US); Russell Speight VanBlon, Raleigh, NC (US); Rod D. Waltermann, Rougemont, NC (US); Suzanne Marion Beaumont, Wake Forest, NC (US); Jonathan Gaither Knox, Morrisville, NC (US); Peter Hamilton Wetsel, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 643 days.

(21) Appl. No.: 14/097,915

(22) Filed: Dec. 5, 2013

(65) Prior Publication Data
US 2015/0161092 A1    Jun. 11, 2015

(51) Int. Cl.
*G06F 17/22* (2006.01)
*G06F 17/24* (2006.01)
*G06F 17/30* (2006.01)

(52) U.S. Cl.
CPC .......... *G06F 17/241* (2013.01); *G06F 17/301* (2013.01); *G06F 17/3053* (2013.01); *G06F 17/30268* (2013.01)

(58) Field of Classification Search
CPC .... G06F 17/30; G06F 17/241; G06F 17/3053; G06F 17/30268
See application file for complete search history.

(56) References Cited

U.S. PATENT DOCUMENTS

| | | | | |
|---|---|---|---|---|
| 6,839,680 B1* | 1/2005 | Liu | ............. | G06Q 30/0204 705/7.33 |
| 7,003,522 B1* | 2/2006 | Reynar | ............. | G06F 17/30896 707/736 |
| 7,873,641 B2* | 1/2011 | Frieden | ............. | G06F 17/30864 707/723 |
| 8,180,767 B2* | 5/2012 | Christian | ............. | G06F 17/30873 707/723 |
| 8,200,669 B1* | 6/2012 | Iampietro | ............. | G06F 17/30784 707/737 |
| 8,346,540 B2* | 1/2013 | Grigsby | ............. | G06F 17/30817 704/1 |
| 8,436,911 B2* | 5/2013 | Leebow | ............. | G06F 17/30265 348/222.1 |
| 8,566,329 B1* | 10/2013 | Freed | ............. | G06F 17/3053 707/748 |
| 8,666,978 B2* | 3/2014 | Moganti | ............. | G06Q 30/0276 345/633 |
| 8,836,811 B2* | 9/2014 | Jape | ............. | H04N 5/772 348/222.1 |
| 9,286,400 B2* | 3/2016 | Chakra | ............. | G06F 17/30867 |

(Continued)

*Primary Examiner* — Maikhanh Nguyen
(74) *Attorney, Agent, or Firm* — Ference & Associates LLC

(57) ABSTRACT

An aspect provides a method, including: accessing, using a processor, a store of historical user object event information; building, using the processor, a tagging profile based on the store of historical user object event information; determining, using the processor, a new user object event; and determining, using the processor, a priority for tag generation for the new object event using the tagging profile. Other aspects are described and claimed.

20 Claims, 3 Drawing Sheets

(56) References Cited

U.S. PATENT DOCUMENTS

| | | | |
|---|---|---|---|
| 9,349,095 B1* | 5/2016 | Tseng | G06F 17/30882 |
| 9,715,542 B2* | 7/2017 | Lu | G06F 17/30864 |
| 2003/0229629 A1* | 12/2003 | Jasinschi | G06F 17/30828 |
| 2006/0224583 A1* | 10/2006 | Fikes | G06F 17/30876 |
| 2007/0078832 A1* | 4/2007 | Ott, IV | G06F 17/30867 |
| 2007/0168335 A1* | 7/2007 | Moore | G06F 17/30864 |
| 2007/0185858 A1* | 8/2007 | Lu | G06F 17/30864 |
| 2007/0211914 A1* | 9/2007 | Buehler | G06K 9/00771 |
| | | | 382/100 |
| 2007/0255695 A1* | 11/2007 | Hu | G06F 17/30265 |
| 2008/0114764 A1* | 5/2008 | Choi | G06F 17/30601 |
| 2008/0244428 A1* | 10/2008 | Fain | G06F 17/30651 |
| | | | 715/764 |
| 2009/0217254 A1* | 8/2009 | Shneerson | G06F 3/0481 |
| | | | 717/168 |
| 2009/0287989 A1* | 11/2009 | Chakra | G06F 17/30867 |
| | | | 715/205 |
| 2010/0005106 A1* | 1/2010 | Carter | G06F 17/30867 |
| | | | 707/E17.112 |
| 2010/0114881 A1* | 5/2010 | Christian | G06F 17/30873 |
| | | | 707/723 |
| 2010/0130226 A1* | 5/2010 | Arrasvuori | H04W 4/02 |
| | | | 455/456.1 |
| 2010/0228715 A1* | 9/2010 | Lawrence | G06F 17/30867 |
| | | | 707/706 |
| 2012/0072419 A1* | 3/2012 | Moganti | G06F 17/30038 |
| | | | 707/737 |
| 2012/0072845 A1* | 3/2012 | John | G06F 17/30038 |
| | | | 715/738 |
| 2012/0265806 A1* | 10/2012 | Blanchflower | G06Q 10/10 |
| | | | 709/204 |
| 2012/0278387 A1* | 11/2012 | Garcia | G06F 3/0481 |
| | | | 709/204 |
| 2013/0120612 A1* | 5/2013 | Jape | H04N 5/772 |
| | | | 348/231.3 |
| 2013/0173533 A1* | 7/2013 | Nichols | G06F 17/30035 |
| | | | 707/609 |
| 2013/0262463 A1* | 10/2013 | Chittar | G06F 17/30595 |
| | | | 707/736 |
| 2013/0262588 A1* | 10/2013 | Barak | H04L 67/22 |
| | | | 709/204 |
| 2014/0372455 A1* | 12/2014 | Locker | G06F 17/301 |
| | | | 707/750 |
| 2014/0372467 A1 | 12/2014 | Locker et al. | |

* cited by examiner

PRIORITIZING SMART TAG CREATION

BACKGROUND

Information handling devices ("devices") come in a variety of forms, for example laptop computing devices, tablet computing devices, smart phones, e-readers, MP3 players, and the like. Such devices are configured for media consumption and users typically store "files", e.g., music, videos, pictures, documents, etc. (hereinafter simply "objects") on the devices.

For example, a typical device user may have thousands and thousands of objects (files, pictures, content, etc.) scattered across his or her device. To compound this, with the advent of cloud computing and remote storage, a user may have objects scattered across many devices (e.g., laptop, tablet, smart phone, work station, etc.) and in cloud storage device(s). The user might remember some things about an object he or she wishes to retrieve, but the user nevertheless often may find it difficult to find it quickly. For example, many devices create media file names that are less than helpful (e.g., a number corresponding to a digital image captured by a smart phone and stored on the smart phone locally and in a cloud or other network connected device). Even if the user has chosen a memorable file name or storage folder, object retrieval can prove challenging in the current use environment where typically the objects are scattered throughout the device and/or devices and not well organized from a retrieval standpoint.

BRIEF SUMMARY

In summary, one aspect provides a method, comprising: accessing, using a processor, a store of historical user object event information; building, using the processor, a tagging profile based on the store of historical user object event information; determining, using the processor, a new user object event; and determining, using the processor, a priority for tag generation for the new object event using the tagging profile.

Another aspect provides an information handling device, comprising: a processor; a memory device that stores instructions accessible to the processor, the instructions being executable by the processor to: access a store of historical user object event information; building a tagging profile based on the store of historical user object event information; determine a new user object event; and determine a priority for tag generation for the new object event using the tagging profile.

A further aspect provides a product, comprising: a storage device having code stored therewith, the code comprising: code that accesses a store of historical user object event information; code that builds a tagging profile based on the store of historical user object event information; code that determines a new user object event; and code that determines a priority for tag generation for the new object event using the tagging profile.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
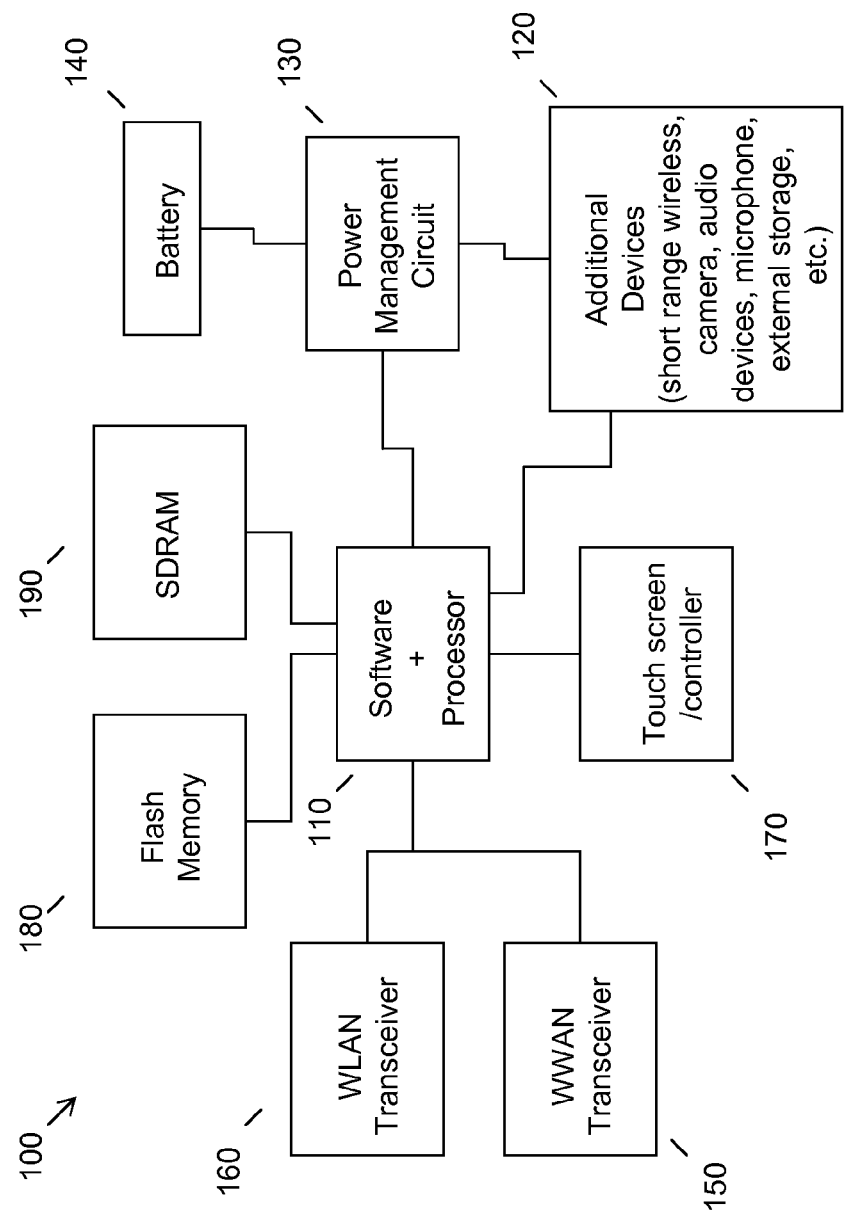
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described in further detail herein, a user is often faced with a serious challenge when attempting to find an object he or she wants, and it is often doubly challenging to find the object quickly. Such a user would benefit greatly from a retrieval mechanism that operates on the principle of tagging objects with data regarding "some thing(s) you will remember a year or more later".

Today users are limited in their object retrieval choices. For instance, users are basically limited to only searching by file name and/or date that file was modified, and/or information inside the file for some type of files (e.g., words contained within a Microsoft WORD document). Unfortunately, from a usability stand point, this is either entirely ineffective (e.g., file name on a video file is a machine generated number) or simply frustrating, as this is not the way our minds work to remember clues about the object (and that are not necessarily in the object), especially if it is a non-data object (picture, video, etc.).

Accordingly, an embodiment provides the ability to use smart tags (also referred to herein simply as "tags") for retrieval of user generated objects (e.g., pictures, documents, files, etc.) that are stored on the user's device(s). Some useful information regarding smart tags is found in copending and commonly assigned U.S. patent application Ser. No. 13/919,293, entitled "SMART TAGS FOR CONTENT RETRIEVAL", filed on Jun. 17, 2013 and in co-pending and commonly assigned U.S. patent application Ser. No. 13/919, 376, entitled "CONTEXTUAL SMART TAGS FOR CONTENT RETRIEVAL", filed on Jun. 17, 2013; the contents of each of these prior applications are incorporated by reference in their entirety herein.

An embodiment permits, for example, generation of a smart tag describing an object (e.g., a picture file, a document, etc.) based on an object event, e.g., information relating to an object created by a user and stored on one of the user's devices. Thus, a user creating a picture file by taking a picture may have a smart tag created and associated therewith and stored in a tag collection, e.g., on the user device and/or in a remote or cloud storage device. The tag may contain metadata, e.g., user provided metadata such as audio for generating key words describing the picture file, and/or system originated data, e.g., from one or more sensors, such as global positioning data regarding the location the picture was taken, data indicating an association of such position with nearby businesses or landmarks as for example available in map data, sensed user devices in the location of the user device utilized to take the picture, e.g., smart phones of friends or family members in the vicinity, etc., data from sensors or other information repositories regarding the environment, e.g., temperature, weather events, ambient light, timing data, etc.

Given the ability to generate such smart tags, a user may be assisted in a search for an object via leveraging the smart tag data in the search. For example, if a user happens to be taking pictures of a friend at a particular occasion, e.g., Bob's 50th birthday party, the user could simply say "Bob's 50th birthday party" to provide speech input for creating a smart tag for the object to be created, i.e., the picture. This information is then processed (e.g., converted using a speech-to-text mechanism) and stored as a separate tag or tags with a link/naming convention linking it to the object (picture). The user may then later retrieve the object, i.e., the picture in this example, simply by inputting a search such as "the picture I took at the birthday party last week" and searching the smart tags for this object.

Tagging the entire content universe of a user (e.g., creating smart tag(s) including all key words contained within a word processing document, for each such document and all other objects, as well as creating other smart tags to capture contextual data, etc.), however, might take a very long time, might consume a large amount of storage, and/or might introduce a time lag for pushing the smart tags into storage, e.g., onto a cloud based storage system. This might cause a delay in query responses or diminished quality of the query responses, unwanted utilization of device resources, etc.

Accordingly, an embodiment takes into account user preferences and/or behaviors when smart tags for content are discovered or created. This facilitates an intelligent smart tag generation process for tagging the content/objects of the user or group of associated users, as further described herein.

An embodiment creates a tagging profile for a user, e.g., via analyzing a query history and/or user feedback regarding query results. A tagging profile may comprise types of content that the user was previously interested in (e.g., word processing documents, calendar entries, etc.) and/or a list of tag categories that is/are relevant, e.g., based on past usage thereof. Thus, an embodiment facilitates user-specific and group specific tagging profiles such that smart tags may be efficiently generated, stored, and/or made accessible to users without over-processing user content or over burdening the user's devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
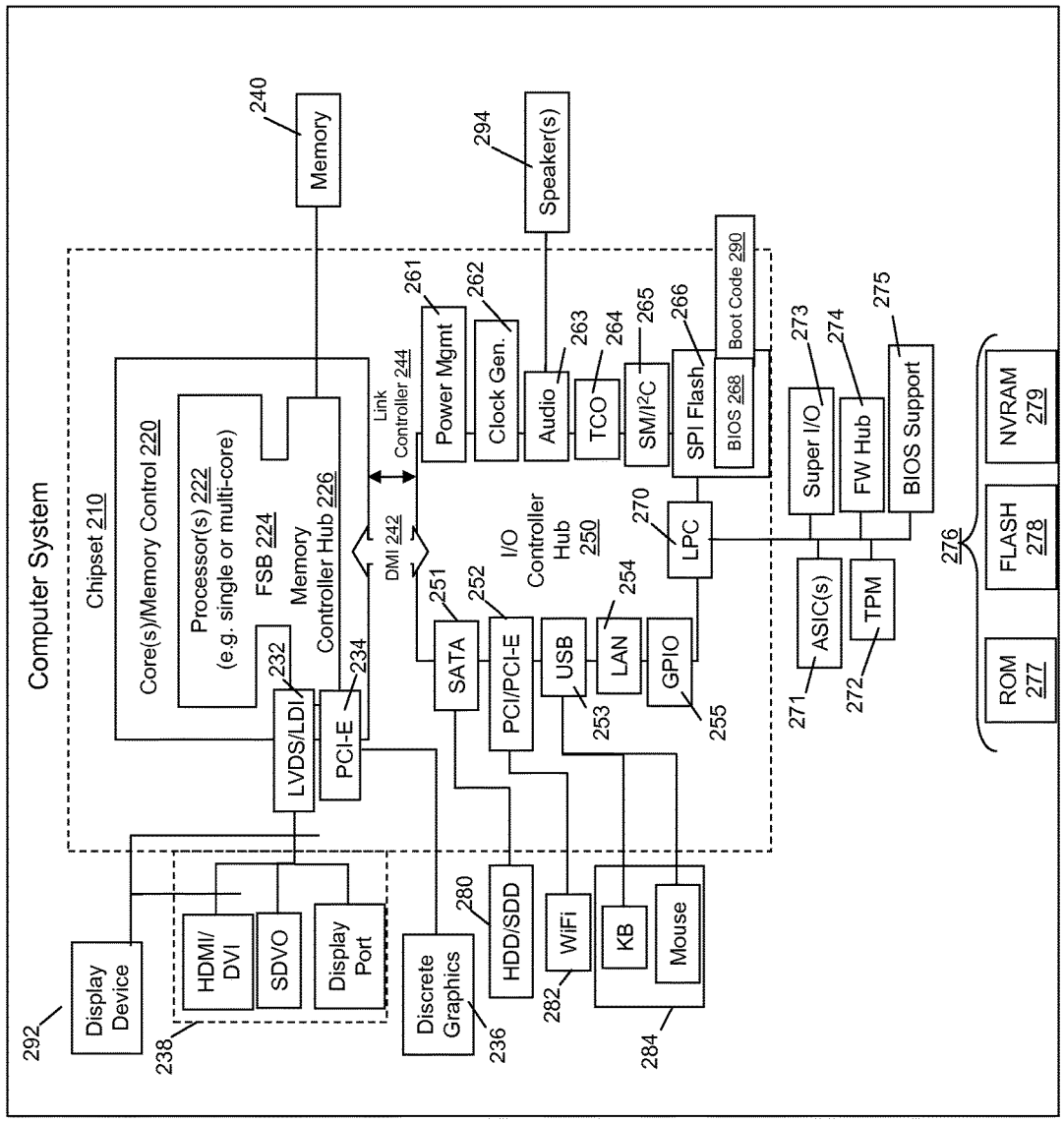
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be user devices that are used to create and/or store objects, e.g., data or files created or consumed by the user. For example, devices including circuitry outlined in the example of FIG. 1 may include a smart phone with which a user takes pictures, takes videos, purchases and downloads music files, sends emails, texts, etc. Each of these data objects or files (simply referred to herein as "objects" or "user objects") may be stored by the user, e.g., on the device, in the cloud, on multiple user devices, etc.

As outlined above, a user will often face a significant challenge when he or she later attempts to find a particular object of interest. This challenge comes from the sheer volume of objects which may be created or generated and stored by the user.

For example, a user may wish to find a file that he or she worked on last week. This may include hundreds of such documents (e.g., word processing documents). Furthermore, if the user is defined as a group of users (e.g., working group, company division, social club, etc.), the list of documents worked on within the last week, month, etc. may grow exponentially.

Embodiments provide for smart tags to be created, thus simplifying the searching and location of such objects, e.g., using parameters or characteristics of interest to the user and thus easily remember. For example, the user may recall that he or she not only worked on a document last week, but also that he or she worked on that document at a coffee shop and that was a day it snowed. These additional parameters or characteristics regarding object context are captured in the smart tags and may be leveraged for object retrieval.

Given the large amount of such context data that may be generated and used in forming the smart tags, an embodiment facilitates an efficient creation or generation process. This allows an embodiment to intelligently prioritize which smart tags are created for an object.

Figure 3:
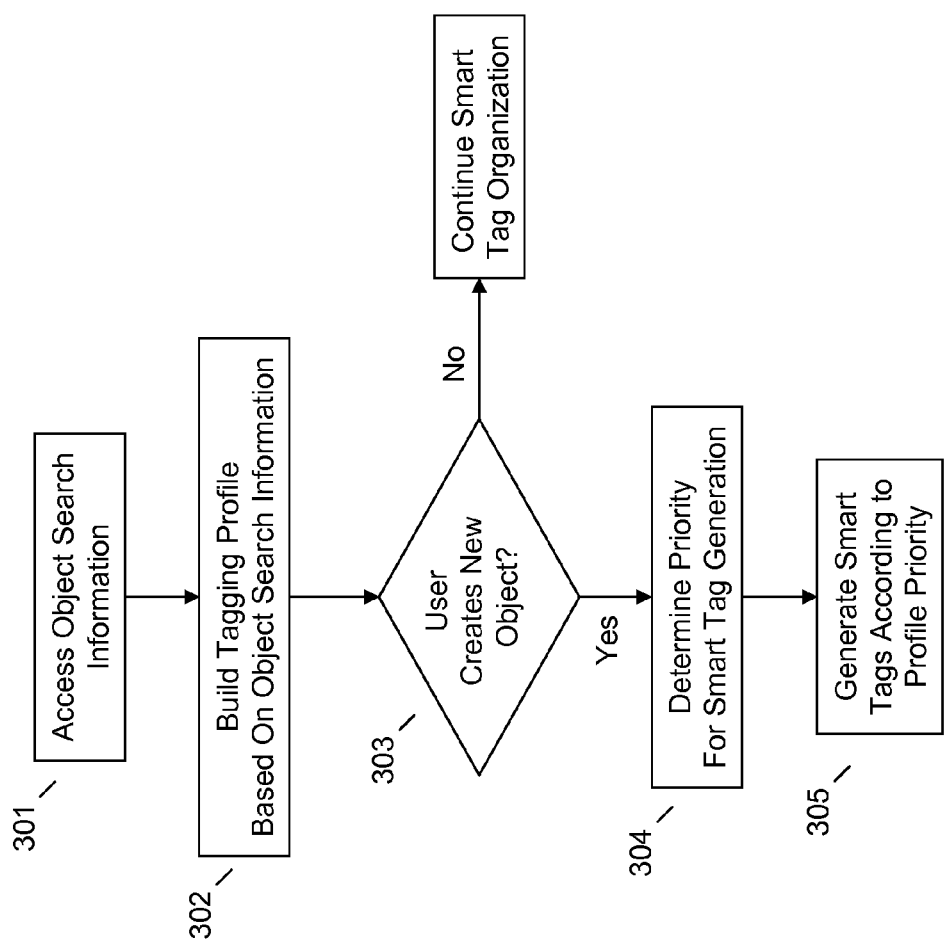
FIG. 3 illustrates an example method of prioritizing smart tag creation.

Referring to FIG. 3, for example, at an appropriate time, e.g., when a user creates an object or prior to object creation, an embodiment may access object search information at 301. This object search information may include historical object searching information of a particular user, a group of users, etc. The object search information may be stored on the user's device, partly on the user's device and partly on another device, or entirely on another device, e.g., a cloud based storage location.

In any event, an embodiment may utilize the object search information to form or build a tagging profile at 302. That is, an embodiment may detect various characteristics captured in or represented by the object search information to profile a particular user, a particular group of users etc. This information may therefore be utilized to build a tagging profile at 302.

For example, an embodiment may analyze a user's query history and/or the user's feedback about the results of queries to extract data useful in forming the tagging profile at 302. By way of example, the tagging profile may include the types of content that the user was previously interested in, as indicated in the object search information, e.g., word processing documents, calendar entries, etc. The tagging profile may include a list of smart tag categories that are relevant to the user, e.g., as indicated by the past usage thereof in completing searches for this particular user, e.g., environmental conditions during object creation/modification, etc. The tagging profile may include a set of smart tags that have been relevant in the past to the user, e.g., specific smart tags/categories used by the user.

With a tagging profile available, when the user next creates an object, e.g., as determined at 303, an embodiment may prioritize the order in which smart tags are generated for the object using the tagging profile at 304. Thus, a user taking a picture, for example, may have indicated in his or her tagging profile that these objects are often searched for using a location smart tag category, e.g., location where picture was taken. Thus, an embodiment may prioritize a location tag category as a priority category, whereas other smart tag categories, e.g., temperature, weather, time, participants, etc., may be determined to be lower priority smart tag categories.

Given this, an embodiment may first create location smart tags of the location smart tag category at 305, e.g., GPS location smart tag, nearby business smart tags, general geographic location smart tags, etc. This facilitates generating the smart tags of a category or categories inferred to be most important to the user according to some metric, e.g., a frequency metric included in the tagging profile. An embodiment may nonetheless generate additional smart tags at 305, even if these tags are associated with lower priority categories, e.g., other user devices detected nearby, timing information, etc. These lower priority category smart tags may be created and stored, transmitted (e.g., to cloud storage), etc., as a background process. For example, if the user has not created an object, e.g., as determined at 303, an embodiment may nonetheless proceed or continue to create, store, organize, transmit, etc., smart tags for previously created objects. Thus, a full set of smart tags may still be generated by an embodiment, but an embodiment intelligently prioritizes smart tag creation, storage, transmission, etc. using a tagging profile of the user or group in question.

The tagging infrastructure may therefore tag content using different processes, e.g., a real-time process to tag what the user is working on right now (e.g., a freshly created object) and a background process that will tag existing content items without the user needing to interact with the system. The tagging infrastructure may use the tagging profile built at 302 to focus the real-time tagging process on the smart tags/tag categories identified as priorities in the tagging profile. The background tagging process may still collect the full set of smart tags, but it will give higher priority to the content items that are of the relevant content types of the tagging profile.

By way of example, a sales representative may work more with a calendar application and an email application than with a word processing application. An embodiment therefore may utilize a tagging profile for the sales representative in which it is indicated that objects of the sales representative's favorite applications should be the primary focus for generating smart tags, e.g., application specific smart tags. It will be appreciated that the tagging profile may be formed, supplemented, updated, etc., according to other like or similar users, e.g., as facilitated by sharing tagging profile attributes among users. Moreover, group tagging profiles for similar or like users may be formed and refined over time such that a user may have a tagging profile built for him or her using group tag usage/behaviors.

The tagging profile thus may be created by analyzing a user's past search queries, the result of such queries, and the items the user preferred in the results. Based on this analysis, it is possible to extract which content types were most relevant for the user in the past. This process may include for example ranking of content types by relevance for the user or group of users.

By applying feature extraction, it is possible to extract a set of smart tags and smart tag categories from the object search information that were most significant in generating the search results for the user. For example, a user might usually search for files by filename and keywords, but never by author. This may result in a tagging profile for this specific user (across devices) which prioritizes file name smart tags and keyword smart tags but not author smart tags. Since tastes and preferences of users may change over time, the tagging profile may be recalculated (e.g., continuously, according to a timing policy, etc.) as the user or group of users is/are using the system.

Calculation of the tagging profile need not suffer from a "cold-start-problem", were in the beginning of an interaction with a user, a system has not collected enough data to calculate an accurate tagging profile. For example, a default tagging profile may be used for such a new user or the user could be classified within known groups of users for which a reasonable default tagging profile is known. Thus, the basis for defining the tag priorities may include a priori rules and/or predefined queries. An embodiment may for example use sample data to seed a database to derive a default priority profile.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accessing, using a processor, a store of historical user object event information comprising object search information associated with queries provided by a user during searches for stored objects;
building, based upon the object search information, a tagging profile for the user using the store of historical user object event information, wherein the tagging profile identifies at least one tag category to be associated with the user based upon content identified from the object search information;
identifying creation of a new user object associated with the user; and
generating at least one tag for the new user object, wherein the generated tag is identified using the tagging profile and prioritizing possible tags for the new user object using the tagging profile.

2. The method of claim 1, wherein the determination is based upon determining a priority tag category for tag generation and determining a lower priority tag category for later tag generation.

3. The method of claim 2, further comprising generating a tag associated with the priority tag category within a predetermined time of the new user object event.

4. The method of claim 3, further comprising thereafter generating a tag associated with the lower priority tag category as a background process.

5. The method of claim 1, wherein the tagging profile is user specific.

6. The method of claim 5, wherein the tagging profile indicates tag categories frequently used by the user.

7. The method of claim 1, wherein the tagging profile is group specific.

8. The method of claim 7, wherein the tagging profile indicates tag categories frequently used by a group.

9. The method of claim 7, wherein the group is associated via cloud account data with a user associated with the new object event.

10. The method of claim 1, wherein a user object is an object created by the user and resident on one or more devices associated with the user.

11. An information handling device, comprising:
a processor;
a memory device that stores instructions accessible to the processor, the instructions being executable by the processor to:
access a store of historical user object event information comprising object search information associated with queries provided by a user during searches for stored objects;
build, based upon the object search information, a tagging profile for the user using the store of historical user object event information, wherein the tagging profile identifies at least one tag category to be associated with the user based upon content identified from the object search information;
identify creation of a new user object associated with the user; and
generate at least one tag for the new user object, wherein the generated tag is identified using the tagging profile and prioritizing possible tags for the new user object using the tagging profile.

12. The information handling device of claim 11, wherein the determination is based upon determining a priority tag category for tag generation and determining a lower priority tag category for later tag generation.

13. The information handling device of claim 12, wherein the instructions are further executable by the processor to generate a tag associated with the priority tag category within a predetermined time of the new user object event.

14. The information handling device of claim 13, wherein the instructions are further executable by the processor to thereafter generate a tag associated with the lower priority tag category as a background process.

15. The information handling device of claim 11, wherein the tagging profile is user specific.

16. The information handling device of claim 15, wherein the tagging profile indicates tag categories frequently used by the user.

17. The information handling device of claim 11, wherein the tagging profile is group specific.

18. The information handling device of claim 17, wherein the tagging profile indicates tag categories frequently used by a group.

19. The information handling device of claim 17, wherein the group is associated via cloud account data with a user associated with the new object event.

20. A product, comprising:
a non-signal storage medium having processor executable code stored therewith, the code comprising:
code that accesses a store of historical user object event information comprising object search information associated with queries provided by a user during searches for stored objects;
code that builds based upon the object search information a tagging profile for the user using the store of historical user object event information, wherein the tagging profile identifies at least one tag category to be associated with the user based upon content identified from the object search information;
code that identifies creation of a new user object associated with the user; and
code that generates at least one tag for the new user object, wherein the generated tag is identified using the tagging profile and prioritizing possible tags for the new user object using the tagging profile.

* * * * *